UNITED STATES PATENT OFFICE.

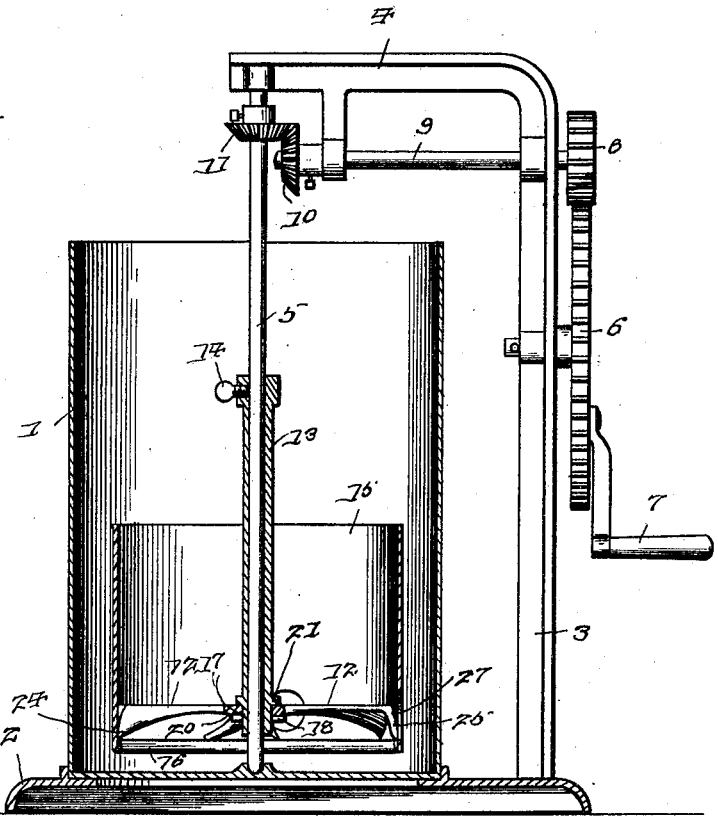

EDWARD R. FRANKLIN, OF AUSTIN, TEXAS, ASSIGNOR TO THE FRANKLIN CHURN COMPANY, OF CHICAGO, ILLINOIS.

CHURN-DASHER.

SPECIFICATION forming part of Letters Patent No. 660,185, dated October 23, 1900.

Application filed June 11, 1900. Serial No. 19,928. (No model.)

*To all whom it may concern:*

Be it known that I, EDWARD R. FRANKLIN, a citizen of the United States, residing at Austin, in the county of Travis and State of Texas, have invented a new and useful Churn-Dasher, of which the following is a specification.

This invention relates to rotary churns, and has for its object to provide an improved dasher therefor, which is constructed to thoroughly agitate the cream by causing currents therein in different directions, so as to more effectively agitate the cream at the center of the churn-body and also around the bottom at the walls thereof. It is furthermore designed to cause a current of cream upwardly at the outer side of the dasher and then downwardly through the same, and also to cause tangential streams or currents at the bottom of the churn, so as to thoroughly agitate all of the cream and effectively intermingle the air therewith.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a vertical central sectional elevation of a churn equipped with the present form of dasher. Fig. 2 is a plan section of the dasher removed. Fig. 3 is a bottom plan section of the dasher. Fig. 4 is a detail side elevation of a portion of the rim of the dasher, showing the discharge-openings therein. Fig. 5 is a detail perspective view of one of the outer ends of the dasher-blades.

Corresponding parts are designated by like characters of reference in all of the figures of the drawings.

Referring to the drawings, 1 designates the body of the churn, which may be of any preferred form and is seated upon a suitable base 2. Rising from the base and at one side of the churn-body is a standard 3, which has a transverse arm 4 at its upper end and overhanging the upper open end of the churn-body. Located within the churn-body is a vertically-disposed rotary dasher rod or shaft 5, which has its opposite ends journaled in the bottom of the churn and the outer end of the transverse arm 4, respectively. This shaft is operated by means of a large gear 6, mounted upon the outer side of the standard and provided with a crank-handle 7 for the convenient operation of the churn. Located above the drive-gear and in mesh therewith is a smaller gear 8, mounted upon the inner end of a transverse horizontal counter-shaft 9, and the opposite end of the latter has a miter-gear 10, which is in mesh with another miter-gear 11 upon the upper end of the dasher-shaft, whereby motion is transferred to the latter.

In carrying out the present invention the dasher proper is formed by means of a plurality of radial blades 12, preferably four in number, from the intersection of which rises a hollow or tubular stem 13 for the reception of the dasher-shaft and having a set-screw 14 to connect the dasher to the shaft. Embracing the outer ends of the blades is a marginal upstanding rim 15, which has its greater portion extended above the plane of the blades and its lower edge being turned inwardly to form a strengthening and stiffening bead 16, upon which the outer ends of the blades are supported, the same also being soldered or otherwise connected to the inner side of the marginal rim.

To removably secure the stem to the dasher, the latter is provided with a central opening 17 for the reception of the lower end of the stem, the latter having a pair of diametrically-opposite lugs or projections 18, which are passed through corresponding slots 19, intersecting the opening in the dasher. At opposite sides of the opening in the dasher and between the opposite slots the under side of the dasher is provided with a pair of oppositely-disposed cam-faces 20 for frictional engagement by the lugs of the stem, the latter also having an annular shoulder 21 to be drawn tightly against the upper face of the dasher by the action of the lugs in passing over the cam-faces. After the stem has been fitted to the dasher a suitable stop pin or shoulder 22 is soldered or otherwise secured to the lower portion of one of the cam-faces, so as to prevent the stem from being accidentally turned backward, which might result in the detachment of the dasher.

Each blade is twisted or beveled, so that its lower face is inclined downwardly and rearwardly with respect to the rotary motion of the dasher, whereby its higher edge 23 is in advance as the dasher turns from left to right or in the direction of the hands of a clock to force the cream downwardly and direct a current against the bottom of the churn, and thereby agitate that portion of the body of cream which heretofore has been slightly, if at all, affected by the movement of the dasher. Also, as indicated in Fig. 1, the pitch of the under side of the blade decreases toward the center of the dasher, whereby the current is also directed toward the center of the churn to cause a thorough agitation of the cream in the center of the bottom portion of the churn-body.

As best indicated in Fig. 5 of the drawings, it will be seen that the outer end of each blade is forked, the rear edge thereof being extended into a rearwardly-directed lip or wing 24, which conforms to the general pitch of the end of the blade and is secured to the inner face of the rim 15. From the upper forward edge of the blade a similar forwardly-directed lip or wing 25 extends or inclines downwardly and forwardly, the outer extremities of both lips resting upon the shoulder formed by the inturned lower edge of the rim. Located between the two lips or members of the forked end of the blade is an exit-opening 26, which is partly surrounded by the lips, and another opening 27 is formed in advance of the former opening and arranged adjacent to the forward or outer face of the forward lip 25, which acts to discharge the cream tangentially outward through the adjacent opening 27. Likewise the inner faces or walls of the two lips direct the cream tangentially outward through the rear opening 26, so that at the end of each dasher-blade there are two currents or streams of cream, one located above and in advance of the other. By this arrangement the cream is drawn from the center of the churn and directed outwardly through the dasher-rim, so as to give an additional impetus to the ascending current at the outer side of the rim.

What is claimed is—

1. A rotary churn-dasher, comprising radial blades, laterally-opposite and downwardly-divergent lips provided at the outer ends of the blades, and an upstanding marginal rim surrounding the ends of the blades and connected to the lips, said rim being provided with perforations located between the lips of respective blades, and other perforations located adjacent to the outer faces of those lips which are in advance of the respective blades, with respect to the rotary motion of the dasher.

2. A rotary churn-dasher, comprising radial blades, which have their lower faces beveled or inclined downwardly and rearwardly with respect to the rotary motion of the dasher and the pitch of said lower faces decreasing toward the center of the dasher, laterally-opposite lips diverging downwardly from the outer ends of the blades, and an upstanding marginal rim surrounding the ends of the blades and connected thereto, said rim also being provided with perforations, which are located between the lips of the respective blades, and other perforations located adjacent to the outer faces of those lips which are upon the advance sides of the blades.

3. A churn-dasher having a central opening, and diametrically-opposite slots intersecting the opening, opposite cam-faces located upon the under side of the dasher and extending in opposite directions between the outer ends of the slots, a stem inserted through the opening from the upper side of the dasher, and provided with diametrically-opposite lugs or projections passed through the slots and lying in frictional engagement with the respective cam-faces, an annular outwardly-directed shoulder upon the stem and above the lugs and bearing against the upper side of the dasher, and a stop-shoulder provided upon one of the cam-faces and in engagement with that side of the adjacent lug which is next to the lower end of the cam-face, whereby disconnection of the parts is prevented.

In testimony that I claim the foregoing as my own I have hereto affixed my signature in the presence of two witnesses.

EDWARD R. FRANKLIN.

Witnesses:
E. A. FRANKLIN,
LOUIS A. DAMMERT.